United States Patent Office 3,215,659
Patented Nov. 2, 1965

3,215,659
SELF-CURING SYNTHETIC POLYMER COMPOSITION
David C. Spaulding, Cuyahoga Falls, Ohio, assignor to The B. F. Goodrich Company, New York, N.Y., a corporation of New York
No Drawing. Filed Apr. 19, 1962, Ser. No. 188,890
11 Claims. (Cl. 260—29.6)

This invention relates to heat curable blends of acrylate interpolymers and more particularly pertains to novel heat curable blends of acrylic ester interpolymers containing aldehyde groups and acrylic ester interpolymers containing active hydrogen groups and to a method for preparing same.

The novel heat curable polymeric compositions of this invention comprise the essential ingredients of (1) an interpolymer of a monomer mixture comprising a lower acrylic ester and an alpha, beta-olefinically unsaturated aldehyde and (2) an interpolymer of a monomer mixture comprising a lower acrylic ester and a polymerizable olefinic compound containing at least one active hydrogen atom.

The lower acrylic esters embodied in the polymeric mixtures of this invention are those having the structure $$CH_2=C-COOR_1$$
$$\phantom{CH_2=}|$$
$$\phantom{CH_2=C-COO}R$$

wherein R is a member of the class consisting of hydrogen and an alkyl group having from 1 to 4 carbon atoms and $R_1$ is a member of the class consisting of alkyl groups having from 1 to 8 carbon atoms and cyano alkyl groups having from 1 to 8 carbon atoms. Representative lower alkyl acrylic esters are methyl acrylate, ethyl acrylate, the propyl acrylates, the butyl acrylates, the amyl acrylates, the hexyl acrylates, cyclohexyl acrylate, the heptyl acrylates and the octyl acrylates; alpha-cyanomethyl acrylate, alpha-cyanoethyl acrylate, beta-cyanoethyl acrylate, the cyanopropyl acrylates, the cyanobutyl acrylates and the like; methyl methacrylate, ethyl methacrylate, the propyl methacrylates, the butyl methacrylates, the amyl methacrylates, the hexyl methacrylates, cyclohexyl methacrylate, the heptyl methacrylates and the octyl methacrylates; alpha-cyanomethyl methacrylate, alpha-cyanoethyl methacrylate, beta-cyanoethyl methacrylate, the cyanopropyl methacrylates, the dicyanopropyl methacrylates, the cyanobutyl methacrylates, the cyanocyclohexyl methacrylates and the like and others. Most preferred in the present invention are the alkyl acrylic esters in which the alkyl group contains from 1 to 4 carbon atoms.

The alpha, beta-olefinically-unsaturated aldehydes useful in the polymeric compositions of this invention are those having the structure $$R_2CH=C-CHO$$
$$\phantom{R_2CH=}|$$
$$\phantom{R_2CH=C-CH}R_3$$

wherein $R_2$ is a member of the class consisting of hydrogen and a hydrocarbon group having from 1 to 8 carbon atoms and $R_3$ is a member of the group consisting of hydrogen and an alkyl group having from 1 to 4 carbon atoms. Representative alpha, beta-olefinically unsaturated aldehydes useful in this invention include acrolein, methacrolein, croton-aldehyde, tiglic aldehyde, sorbic aldehyde, cinnamic aldehyde, and the like. Most preferred because of their ready availability and their better copolymerization properties are acrolein and methacrolein.

The polymerizable olefinic compounds containing at least one active hydrogen group embodied in this invention are compounds containing at least one copolymerizable >C=C< group and at least one active hydrogen as determined by the well known Zerewitinoff method of analysis. Suitable functional groups containing active hydrogens include hydroxyls, sulfhydryls, carboxyls, primary and secondary amines, primary and secondary amides,

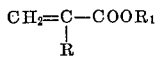

groups adjacent to a negative group such as carbonyl, sulfonyl, and the like. Most preferred are olefinically unsaturated compounds which contain hydroxyls or groups readily converted to hydroxyls by hydrolysis such as acetal and epoxy groups, primary amino or secondary amino groups and are copolymerizable with lower acrylate esters. Representative active hydrogen containing olefinically unsaturated monomers of the foregoing types include ethylene glycol monoacrylate, the propylene glycol monoacrylates, ethylene glycol monomethacrylate, the propylene glycol monomethacrylates, glycerol monoacrylate, glycidyl acrylate, glycidyl methacrylate, glycerol monoalkyl ether, glycerol monomethallyl ether, glycerol monovinylether, trimethylol propane monoallyl ether, sucrose monoallyl ether, pentaerythritol monoallyl ether, the monomer having the structure

and marketed under the name "Cyclol" (2-hydroxyethyl-5-norbornene, N-methylolacrylamide, N-ethylolacrylamide, N-methylolmethacrylamide, N-ethylolmethacrylamide, p-vinyl N-methylol benzamide, 2-amino ethyl vinyl ether, 3-amino propyl vinyl ether, 4-amino cyclohexyl vinyl ether, N-methyl 2-amino propyl vinyl ether, 6-amino hexyl vinyl ether, 2-ethyl-3-acryloxy methyl-1-oxacyclobutane and the like.

Most preferred in the present invention are the self-curing mixtures of (1) a copolymer of from 90 to 99.5% by weight of at least one monomer having the structure

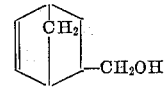

wherein $n$ represents 0 and 1 and $R_1$ is an alkyl group having from 1 to 4 carbon atoms and from 0.5 to 10% by weight of at least one member selected from the group consisting of acrolein and methacrolein and (2) a copolymer of from 80 to 99% by weight of at least one monomer having the structure

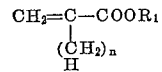

wherein $n$ represents 0 and 1 and $R_1$ is an alkyl group having from 1 to 4 carbon atoms and from 1 to 20% by weight of at least one member selected from the group consisting of ethylene glycol monoacrylate, the propylene glycol monoacrylates, the glycerol monoacrylates, ethylene glycol monomethacrylate, the propylene glycol monomethacrylates, the glycerol monomethacrylates, glycerol monoallyl ether, glycerol monomethallyl ether, ethylene glycol monovinyl ether, glycerol monovinyl ether

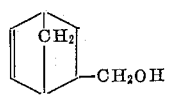

N-methylol acrylamide, N-ethylol acrylamide, N-methylol methacrylamide, 2-amino ethyl vinyl ether, 3-amino propyl vinyl ether, 4-amino cyclohexyl vinyl ether, N-methyl 2-amino propyl vinyl ether, 6-amino hexyl vinyl ether and 2-ethyl-3-acryloxy methyl-1-oxacyclobutane.

Because it is believed that the aldehyde component of the one interpolymer tends to react (in the solid state) with the active hydrogen component of the second interpolymer it is necessary to maintain the individual particles of the interpolymers separated from one another until such time as the cure reaction is desired and such separation can be achieved by preparing the individual interpolymers in latex form and mixing the latices in about stoichiometric proportions of their reactive group content.

The mixed polymers surprisingly do not undergo cure reaction while in the latex state and remain stable over extended periods of time. However, on coagulation or drying of these mixed latices, the individual interpolymers are capable of interacting readily to form a cured (highly gelled, insoluble) structure. It is therefore preferred that the individual interpolymers of this invention be prepared in latex form and that the emulsifier and stabilizer systems used in their preparation be compatible so that the latices will not be coagulated on mixing. That is to say, the emulsifier and other agents present in the individual interpolymer latices must be compatible with each other, and preferably should be of a single type such as anionic, cationic or non-ionic. The proper choice and use of such agents is well known to those skilled in the art of latex polymerization, and while it is generally preferred that the emulsifier used be of an anionic nature, it is also within the scope of this invention to use a cationic emulsifier, or mixtures of either an anionic or cationic emulsifier with added emulsifier of non-ionic character.

The individual interpolymer latices of this invention are preferably prepared by procedures known in the art and as set forth in the following examples wherein the amounts of ingredients are expressed in parts by weight unless otherwise indicated. It is to be understood that the following examples are merely illustrative and are not intended to limit the scope of the invention.

g. of boiled, distilled water and 100 ml. of this solution were treated in a Waring Blendor with 100 g. of monomer mixture as shown in the following table to form an emulsion. The remainder of the soap solution was charged together with 40 ml. of the monomer emulsion and 0.3 g. of potassium persulfate to a 500 ml. flask fitted with a mechanical stirrer, thermometer, dropping funnel, condenser and nitrogen inlet tube. The flask was swept with nitrogen, and the contents heated with stirring to a temperature of about 75° C. When the mixture acquired a milky appearance, the remainder of the monomer emulsion was added slowly with stirring, through the dropping funnel, the addition being completed over about a 30 minute period, during which time the temperature was allowed to climb to about 90° C. The contents were then heated to 98° C. and held there for an additional period, following which the resultant latex was stripped of residual monomer at reduced pressure. The resulting latices were analyzed for total solids content and 40 gm. samples cast onto a glass surface and allowed to air dry to form films for analysis and testing.

| Monomers | Latex | | | | | |
|---|---|---|---|---|---|---|
| | A | B | C | D | E | F |
| Ethyl Acrylate | 100 | 99.4 | 98.75 | 97.5 | 95 | 90 |
| Acrolein | 0 | 0.6 | 1.25 | 2.5 | 5 | 10 |
| Latex Total Solids | | | 40 | | | |
| Percent Conversion | | | 99 | | | |
| Aldehyde content (Millimoles/g. of polymer) | | 0.148 | .224 | .446 | .553 | 1.13 |
| Film Properties: | | | | | | |
| Percent Gel (Toluene) | 46 | 67 | 84 | 90 | 93 | 94 |
| Percent Swell (Acetone) | Soluble | 181 | 128 | 96 | 71 | 63 |
| Softening Temp. (° C.) | 21 | 26 | 28 | 32 | 54 | 70 |

ACTIVE HYDROGEN POLYMER LATEX

This procedure illustrates the preparation of a number of latices of interpolymers of ethyl acrylate with various hydroxyl-containing monomers.

The polymerizations were conducted in the manner and using the apparatus described under the foregoing heading "Aldehyde Polymer Latex."

| Latex | A | B | C | D | E | F | G |
|---|---|---|---|---|---|---|---|
| Duponol ME (Sodium lauryl sulfate) | 3.0 | 3.0 | 9.0 | 6.0 | 6.0 | 4.5 | 3.0 |
| Potassium persulfate | 0.20 | 0.20 | | | | 0.30 | |
| Azodiisobutyronitrile | | | 0.53 | 0.53 | 0.53 | | 0.53 |
| Water | 150 | 150 | | | 300 | | |
| Ethyl acrylate | 90 | 80 | 97.5 | 97.5 | 97.5 | 96 | 95 |
| —CH²OH (Cyclol) | 10 | | | | | | |
| Propylene glycol monoacrylate | | 20 | | | | | |
| N-methylol acrylamide | | | 2.5 | | | | |
| N-ethylol acrylamide | | | | 2.5 | | | |
| 2-ethyl-3-acryloxy methyl-1-oxacyclobutane | | | | | 2.5 | | |
| Trimethylol propane monoallyl ether | | | | | | 4 | |
| Glycidyl methacrylate | | | | | | | 5 |
| Latex Total Solids | 40.3 | 40.3 | 24.4 | 25.1 | 24.7 | 24.3 | 24.6 |
| Percent Conversion | 97.5 | 92 | 80 | 92 | 94 | 91 | 99 |
| —OH Content (millimoles/g. of polymer) | 0.695 | 1.05 | 0.25 | .238 | | .42 | .086 |
| Film Properties: | | | | | | | |
| Percent Gel (Toluene) | 44 | 0 | | | | | |
| Percent Swell (Acetone) | 132 | Soluble | | | | | |
| Softening Temp. (° C.) | 49 | 33 | 32 | 33 | 33 | 3 | 30 |

ALDEHYDE POLYMER LATEX

This procedure illustrates the preparation of a series of acrolein/ethyl acrylate copolymer latices wherein the copolymer is of varying acrolein content. 3.0 g. of Duponol ME (sodium lauryl sulfate) were dissolved in 150

*Example 1*

This example illustrates the results obtained by mixing an acrolein/ethyl acrylate latex (Aldehyde Polymer Latex C) with active Hydrogen Latex A and casting a film from the mixture. The individual latices were mixed in amounts containing stoichiometric quantities of aldehyde and hydroxyl groups and the cast film was dried at room temperature.

Wt. Aldehyde Polymer Latex C _____ gm__ 44.50
Wt. Active Hydrogen Polymer Latex A ____ gm__ 13.90
Millimoles —CHO/g. of polymer _____ 10
Millimoles —OH/g. of polymer _____ 20

| | Aldehyde Polymer Latex C | Active Hydrogen Polymer Latex A | Mixed Latices |
|---|---|---|---|
| Film Appearance | (¹) | (¹) | (¹) |
| Percent Gel (Toluene) | 84 | 44 | 96 |
| Percent Swell (Acetone) | 128 | 132 | 95 |
| Softening Temp., °C | 28 | 49 | 58 |
| Tensile Strength, p.s.i. | 203 | 420 | 610 |
| Elongation, Percent | 565 | 645 | 280 |

¹ Colorless.

When heated to 150° C. for a period of 1 hour the above films showed the following properties:

| | Aldehyde Polymer Latex C | Active Hydrogen Polymer Latex A | Mixed Latices |
|---|---|---|---|
| Appearance | (¹) | (²) | (²) |
| Percent Gel (Toluene) | 38 | 96 | 84 |
| Percent Swell (Acetone) | 174 | 67 | 18 |
| Softening Temp., °C | 32 | 60 | 60 |
| Tensile, p.s.i. | 224 | 584 | 770 |
| Elongation, Percent | 960 | 225 | 205 |

¹ Brown-Sticky.
² Colorless.

Example II 20 gm. of Aldehyde Polymer Latex E were mixed with 22.8 g. of active hydrogen polymer latex B. The mixture was cast onto a glass plate and dried in air to form a film. Separate portions of the film were cured at room temperature and by heating for 1 hour at 100 and at 150° C. The properties of the film are shown in the following table, which also shows the properties of film cast from the individual latices and cured in a similar manner.

| Latex | Mixture | | | Aldehyde Polymer Latex E | | | Active Hydrogen Polymer Latex B | | |
|---|---|---|---|---|---|---|---|---|---|
| Cure Temp., °C | ¹RT | 100 | 150 | RT | 100 | 150 | RT | 100 | 150 |
| Color | | Colorless | | | Colorless | | (²) | (³) | (⁴) |
| Percent Gel (Toluene) | 91 | 96 | 93 | 78 | 81 | 71 | 0 | 68 | 71 |
| Percent Swell (Acetone) | 98 | 67 | 33 | 111 | 118 | 136 | (⁵) | 172 | 133 |
| Softening Temp., °C | 59 | 59 | 59 | 39 | 47 | 46 | 31 | 32 | 48 |

¹ Room temperature.
² Colorless.
³ Sl. color.
⁴ Brown.
⁵ Soluble.

Example III 9.4 g. of Aldehyde Polymer Latex C were mixed with 33.4 g. of active hydrogen polymer latex D. Films were cast from the mixture and cured as in Example II. The film dried at room temperature swelled in acetone to the extent of 128% whereas, a film prepared from the aldehyde polymer latex C alone swelled 167% and a similar film prepared from the active hydrogen polymer latex D alone was completely soluble in acetone.

Example IV 22.8 g. of aldehyde polymer latex B were mixed with 27.2 g. of active hydrogen polymer latex E. Films were cast from the mixed latex and cured as in Example II. The following table sets forth the properties of the cured films in comparison with film prepared in a similar manner from the individual latices and indicates that the film of this example underwent cure in contrast to the film prepared from the individual latices.

| Latex Used | Mixed Latex | | | Aldehyde Polymer Latex B | | | Active Hydrogen Polymer Latex E | | |
|---|---|---|---|---|---|---|---|---|---|
| Cure Temp | RT | 100 | 150 | RT | 100 | 150 | RT | 100 | 150 |
| Percent Swell (Acetone) | 250 | 90 | 95 | (¹) | 181 | 174 | | Soluble | |
| Gel Content, Percent (Toluene) | 84 | 95 | 99 | 46 | 67 | 84 | | 5 | |

¹ Soluble.

Example V 23.2 g. of active hydrogen polymer latex G were mixed with 18.8 g. of aldehyde polymer latex C. A film was cast from the latex mixture and portions of it were cured at room temperature, 100° C. and 150° C. Comparison of its properties with those of similar films prepared from the individual latices used showed an improved cure of the film of this example.

| Latex Used | Mixed Latex | | | Aldehyde Polymer Latex C | | | Active Hydrogen Polymer Latex G | | |
|---|---|---|---|---|---|---|---|---|---|
| Cure Temp | RT | 100 | 150 | RT | 100 | 150 | RT | 100 | 150 |
| Percent Swell (Acetone) | 127 | 123 | 76 | 128 | 120 | 174 | (¹) | (¹) | 165 |
| Gel Content, Percent (Toluene) | 95 | 95 | 94 | 84 | 87 | 38 | 0 | 0 | 40 |

¹ Soluble.

Example VI 26.6 g. of active hydrogen polymer latex E were mixed with 12.3 g. of aldehyde polymer latex C. Portions of a film cast from the mixture were cured at room temperature, 100° C. and 150° C. and evaluated together with films cured in a similar manner from the individual latices. The following table shows that film of this example underwent a cure in contrast to those from the individual latices.

| Latex Used | Mixed Latices | | | Aldehyde Polymer Latex C | | | Active Hydrogen Polymer Latex E | | |
|---|---|---|---|---|---|---|---|---|---|
| Cure Temp | RT | 100 | 150 | RT | 100 | 150 | RT | 100 | 150 |
| Percent Swell (Acetone) | 99 | 91 | 71 | 128 | 120 | 174 | | Soluble | |

*Example VII*

95 g. of ethyl acrylate were copolymerized with 5 g. of 2-amino ethyl vinyl ether in the manner described under the heading "Active Hydrogen Polymer Latex" above to yield a copolymer latex having a total solids content of 25.7% and an amino group content of 0.148 millimol/g. of latex. 67.5 g. of this latex were mixed with 57.0 g. of an aldehyde polymer latex D. Films were cast from this mixture and from the individual latices and cured at room temperature, 100° C. and 150° C. for 1 hour. The properties of the resultant film are given below.

| Latex Used | Mixed Latex | | | Aldehyde Polymer Latex D | | | Amine Latex | | |
|---|---|---|---|---|---|---|---|---|---|
| Cure Temp | RT | 100 | 150 | RT | 100 | 150 | RT | 100 | 150 |
| Percent Swell (Acetone) | 117 | 99 | 72 | 111 | 124 | 177 | 284 | 200 | 118 |
| Percent Gel Content (Toluene) | 92 | 92 | 97 | 81 | 81 | 52 | 72 | 74 | 88 |

I claim:
1. The heat curable polymeric composition comprising latices of (1) a copolymer of a monomer mixture comprising from about 90 to 99.5% by weight of a lower acrylic ester and 0.5 to about 10% by weight of an alpha, beta-olefinically unsaturated aldehyde and (2) a copolymer of a monomer mixture comprising from about 80 to 99% by weight of a lower acrylic ester and from 1 to 20% by weight of a polymerizable olefinic compound containing at least one active hydrogen atom as determined by the Zerewitinoff method, the proportions of (1) and (2) being substantially stoichiometric, based on the respective reactive group content of each said copolymer.

2. The heat curable polymeric composition comprising a mixture of latices (1) a copolymer of (a) from about 90 to 99.5% by weight of an acrylic ester having the structure

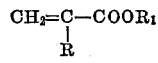

wherein R is a member of the class consisting of hydrogen and an alkyl group having from 1 to 4 carbon atoms and $R_1$ is a member of the class consisting of an alkyl group having from 1 to 8 carbon atoms and a cyanoalkyl group having from 1 to 8 carbon atoms and (b) from 0.5 to about 10% by weight of an alpha, beta-olefinically unsaturated aldehyde having the structure

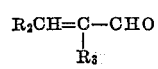

wherein $R_2$ is a member of the class consisting of hydrogen and a hydrocarbon group having from 1 to 8 carbon atoms and $R_3$ is a member of the group consisting of hydrogen and an alkyl group having from 1 to 4 carbon atoms and (2) a copolymer of (a) from about 80 to 99% by weight of an acrylic ester having the structure

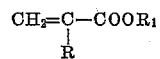

wherein R and $R_1$ have the foregoing designations and (b) from about 20 to 1% by weight of at least one polymerizable olefinic compound having at least one active hydrogen as determined by the Zerewitinoff method of analysis proportions (1) and (2) being substantially stoichiometric based on the respective reactive group content of each said copolymer.

3. The curable composition comprising a mixture of an aqueous latex of (1) a copolymer of (a) from 90 to 99.5% by weight of at least one acrylic monomer having the structure

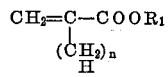

wherein $n$ represents 0 and 1 and $R_1$ is an alkyl group having from 1 to 4 carbon atoms and (b) from 0.5 to 10% by weight of at least one aldehyde of the formula

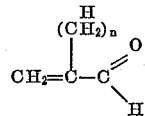

wherein $n$ has the foregoing designation and an aqueous latex of (2) a copolymer of (a) from 80 to 90% by weight of at least one acrylic monomer having the structure

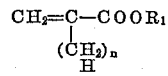

wherein $n$ represents 0 and 1 and $R_1$ have the foregoing designations and (b) from 1 to 20% by weight of at least one active hydrogen monomer selected from the group consisting of ethylene glycol monoacrylate, the propylene glycol monoacrylates, the glycerol monoacrylates, ethylene glycol monomethacrylate, the propylene glycol monomethacrylates, the glycerol monomethacrylates, glycerol monoallyl ether, glycerol monomethallyl ether, ethylene glycol monovinyl ether, glycerol monovinyl ether,

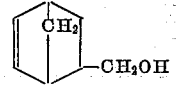

N-methylol acrylamide, N-ethylolacrylamide, N-methylol methacrylamide, 2-amino ethyl vinyl ether, 3-amino propyl vinyl ether, 4-amino cyclohexyl vinyl ether, N-methyl 2-amino propyl vinyl ether, 6-amino hexyl vinyl ether and 2-ethyl-3-acryloxy methyl-1-oxacyclobutane the proportion of (1) and (2) being substantially stoichiometric based on the respective reactive group content of each said copolymer.

4. The cured composition resulting from the reaction of an intimate mixture of latices of (1) a copolymer of (a) from 90 to 99.5% by weight of at least one acrylic monomer having the structure

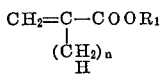

wherein $n$ represents 0 and 1 and $R_1$ is an alkyl group having from 1 to 4 carbon atoms and (b) from 0.5 to 10% by weight of at least one aldehyde of the formula

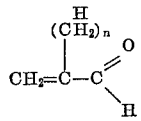

wherein $n$ has the foregoing designation and (2) a copolymer of (a) from 80 to 99% by weight of at least one acrylic monomer having the structure

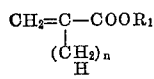

wherein $n$ represents 0 and 1 and $R_1$ have the foregoing designations and (b) from 1 to 20% by weight of at least one active hydrogen monomer selected from the group consisting of ethylene glycol monoacrylate, the propylene glycol monoacrylates, the glycerol monoacrylates, ethylene glycol monomethacrylates, the propylene glycol monoacrylates, the glycerol monomethacrylates, glycerol monoallyl ether, glycerol monomethallyl ether, ethylene glycol monovinyl ether, glycerol monovinyl ether,

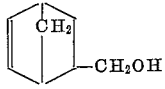

N-methylol acrylamide, N-ethylol acrylamide, N-methylol methacrylamide, 2-amino ethyl vinyl ether, 3-amino propyl vinyl ether, 4-amino cyclohexyl vinyl ether, N-methyl 2-amino propyl vinyl ether, 6-amino hexyl vinyl ether and 2-ethyl-3-acryloxy methyl-1-oxacyclobutane the proportion of (1) and (2) being substantially stoichiometric based on the respective reactive group content of each said copolymer.

5. The composition of claim 3 wherein the acrylic monomer is ethyl acrylate, the aldehyde monomer is acrolein and the active monomer is

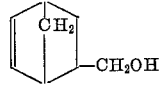

6. The composition of claim 3 wherein the acrylic monomer is ethyl acrylate, the aldehyde monomer is acrolein and the active hydrogen monomer is propylene glycol monoacrylate.

7. The composition of claim 3 wherein the acrylic monomer is ethyl acrylate, the aldehyde monomer is acrolein and the active hydrogen monomer is N-methylol acrylamide.

8. The composition of claim 3 wherein the acrylic monomer is ethyl acrylate, the aldehyde monomer is acrolein and the active hydrogen monomer is 2-ethyl-3-acryloxy methyl-1-oxacyclobutane.

9. The composition of claim 3 wherein the acrylic monomer is ethyl acrylate, the aldehyde monomer is acrolein and the active hydrogen monomer is trimethylol propane monoallyl ether.

10. The composition of claim 3 wherein the acrylic monomer is ethyl acrylate, the aldehyde monomer is acrolein and the active hydrogen monomer is glycidyl methacrylate.

11. The composition of claim 3 wherein the acrylic monomer is ethyl acrylate, the aldehyde monomer is acrolein and the active hydrogen monomer is 2-amino ethyl vinyl ether.

References Cited by the Examiner
UNITED STATES PATENTS

| | | | |
|---|---|---|---|
| 2,657,192 | 10/53 | Miller et al. | 260—73 |
| 2,681,897 | 6/54 | Frazier | 260—86.1 |
| 3,002,959 | 10/61 | Hicks | 260—88.1 |
| 3,038,886 | 6/62 | Hayes | 260—45.5 |

WILLIAM H. SHORT, *Primary Examiner.*

UNITED STATES PATENT OFFICE
CERTIFICATE OF CORRECTION

Patent No. 3,215,659  November 2, 1965

David C. Spaulding

It is hereby certified that error appears in the above numbered patent requiring correction and that the said Letters Patent should read as corrected below.

Column 5, in the second table, third column, line 5 thereof, for "584" read -- 587 --; column 7, line 40, for "mivture" read -- mixture --; column 8, line 53, for "90%" read -- 99% --.

Signed and sealed this 13th day of December 1966.

(SEAL)
Attest:

ERNEST W. SWIDER  EDWARD J. BRENNER
Attesting Officer  Commissioner of Patents